Figure 1:
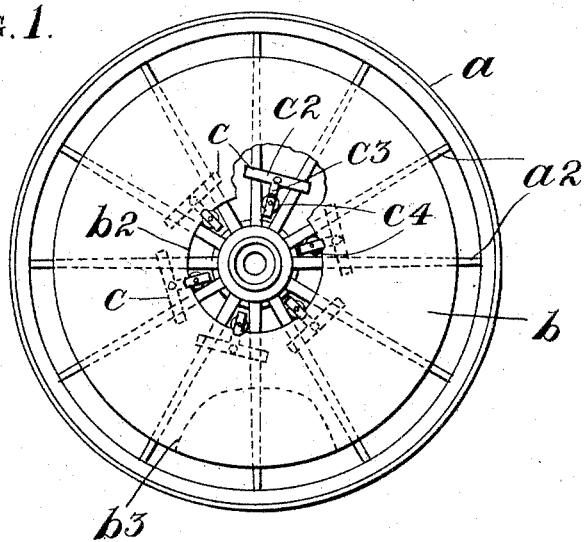

No. 777,532. PATENTED DEC. 13, 1904.
W. J. PAULSEN.
ADVERTISING DEVICE.
APPLICATION FILED MAR. 4, 1904.
NO MODEL.

WITNESSES
A. B. Mattingly
F. A. Stewart

INVENTOR
William J. Paulsen,
BY Edgar Tate & Co
ATTORNEYS

No. 777,532.

Patented December 13, 1904.

UNITED STATES PATENT OFFICE.

WILLIAM J. PAULSEN, OF NEW YORK, N. Y.

ADVERTISING DEVICE.

SPECIFICATION forming part of Letters Patent No. 777,532, dated December 13, 1904.

Application filed March 4, 1904. Serial No. 196,484. (No model.)

*To all whom it may concern:*

Be it known that I, WILLIAM J. PAULSEN, a citizen of the United States, residing at New York, in the county of New York and State of New York, have invented certain new and useful Improvements in Advertising Devices, of which the following is a specification, such as will enable those skilled in the art to which it appertains to make and use the same.

This invention relates to advertising apparatus or devices; and the object thereof is to provide improved apparatus or devices of this class adapted for use in connection with the wheels of a vehicle; and with this and other objects in view the invention consists in the construction, combination, and arrangement of parts hereinafter described and claimed.

The invention is fully disclosed in the following specification, of which the accompanying drawings form a part, in which the separate parts of my improvement are designated by suitable reference characters in each of the views, and in which—

Figure 2:
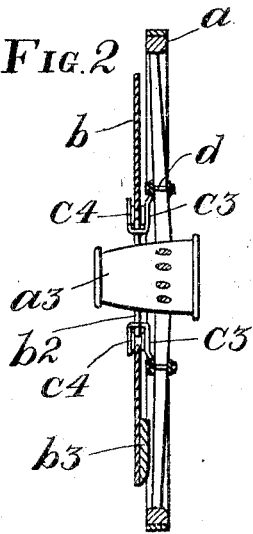
Figure 3:
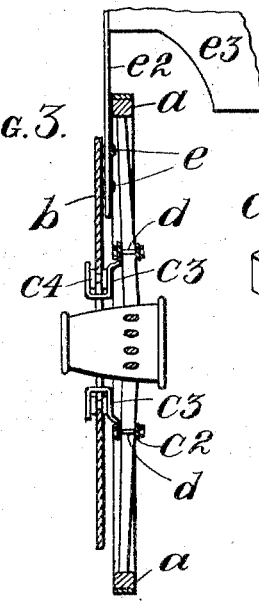
Figure 4:
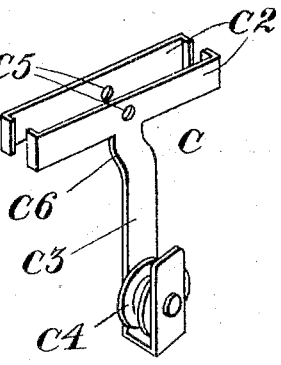

Figure 1 is a side view of a vehicle-wheel provided with my improvement; Fig. 2, a partial transverse section thereof; Fig. 3, a view similar to Fig. 2, but showing a modification; and Fig. 4, a perspective view of a part of the apparatus which I employ.

In the drawings forming part of this specification I have shown at $a$ an ordinary vehicle-wheel, the object of my invention being to provide an advertising apparatus or device which may be used on the wheels of trucks, express-wagons, delivery-wagons, and various other vehicles of this class, and in the practice of my invention I connect with the outside of the wheel $a$ a plate $b$, on which various advertisements of any kind or class may be placed, and said plate $b$ is connected with the wheel $a$ in such a manner that it does not turn with said wheel. In connecting the plate $b$ with the wheel $a$ in the form of construction shown I provide attaching devices $c$, comprising parallel jaws $c^2$, adapted to grasp two of the spokes $a^2$ of the wheel, and one of said jaws is provided with an arm $c^3$, which projects inwardly toward the hub of the wheel between the spokes $a^2$, to which the attaching device $c$ is secured, and the arm $c^3$ is provided in the end thereof with an antifriction-roller $c^4$. In connecting the attaching device $c$ to the spokes $a^2$ a screw or bolt $d$ is passed through holes $c^5$ in the jaws $c^2$ and between the spokes, and by this means the jaws $c^2$ are securely clamped to two of the spokes. The arm $c^3$ of the attaching devices $c$ is bent outwardly, as shown at $c^6$, so that the antifriction-roller $c^4$ will be supported in a circle parallel with the plane of the spokes, but outside thereof, as clearly shown in Figs. 2 and 3.

In the form of construction shown the attaching devices $c$ are placed between the alternate pairs of spokes and the antifriction-rollers $c^4$ support the plate $b$, which in the form of construction shown is circular, but which may be of any desired shape. In practice the plate $b$ is provided with a central opening $b^2$, and the attaching devices $c$ are adjusted on the spokes $a^2$ so that the antifriction-rollers $c^4$ will bear on the walls of this opening at all points. In the form of construction shown in Figs. 1 and 2 the plate $b$ is weighted at the bottom thereof, as shown at $b^3$, and this weight holds the plate in one position at all times, the rollers $c^4$ turning with the wheel and also turning on their own supports and the weight at $b^3$ serving to hold the plate stationary and to prevent it from turning.

Instead of employing the weight $b^3$ I may provide the top portion of the plate $b$ with keepers $e$ and pass therethrough a rod $e^2$, to which is secured an arm or other attaching device $e^3$, which may be secured to any part of the vehicle-body, and the rod $e^2$ will be free to pass through the keepers $e$ or to slide therein and will prevent the plate $b$ from turning.

Although I have described the part $b$ as a "plate," it will be apparent that any suitable device for supporting an advertisement may be employed in this connection, and the advertisement may be placed thereon in any preferred way. It will also be observed that the part $b$ is of less diameter than the wheel $a$ and is so connected with said wheel that the hub $a^3$ of the wheel projects through the opening $b^2$ in the part $b$, and my improvement does not interfere in any way with the operation of the vehicle or of the wheel $a$.

My invention is not limited to the particular construction herein shown and described, and various changes therein and modifications thereof may be made without departing from the spirit of my invention or sacrificing its advantages, and I reserve the right to make all such alterations as fairly come within the scope of the invention.

Having fully described my invention, what I claim as new, and desire to secure by Letters Patent, is—

1. The herein-described advertising device for the wheels of vehicles, said device consisting of a plate having a central opening through which the outer end of the hub passes and which is much larger than said hub, attaching devices supported by and between the spokes of the wheel and having radially-arranged arms which extend inwardly toward the hub, said arms being set outwardly in a plane parallel with the spokes of the wheel, grooved antifriction-rollers mounted in the ends of said arms and extending into the opening in said plate and adapted to support said plate, and devices to prevent the turning of said plate with the wheel, substantially as shown and described.

2. The herein-described advertising device for the wheels of vehicles, said device consisting of a plate having a central opening through which the outer end of the hub passes and which is much larger than said hub, attaching devices supported by and between the spokes of the wheel and having radially-arranged arms which extend inwardly toward the hub, said arms being set outwardly in a plane parallel with the spokes of the wheel, grooved antifriction-rollers mounted in the ends of said arms and extending into the opening in said plate and adapted to support said plate, and devices to prevent the turning of said plate with the wheel, independent of the wheel, substantially as shown and described.

3. The herein-described advertising device for the wheels of a vehicle, said device consisting of a plate having a central opening through which the hub of the wheel passes and which is much larger than said hub, attaching devices supported by and between the spokes of the wheel and having radially-arranged arms which extend inwardly, said arms being set outwardly in a plane parallel with the spokes of the wheel, grooved antifriction-rollers mounted in the ends of said arms and inclosed by said plate and adapted to support the same, said attaching devices being adjustable longitudinally of the spokes, and being provided with two jaws adapted to be secured to two of said spokes and one of which is detachable, substantially as shown and described.

In testimony that I claim the foregoing as my invention I have signed my name, in presence of the subscribing witnesses, this 2d day of March, 1904.

WILLIAM J. PAULSEN.

Witnesses:
F. A. STEWART,
C. E. MULREANY.